US012491624B2

(12) United States Patent
Tang et al.

(10) Patent No.: US 12,491,624 B2
(45) Date of Patent: Dec. 9, 2025

(54) INDUSTRIAL BORESCOPE SYSTEM WITH ADJUSTABLE STIFFNESS INSERTION TUBE

(71) Applicant: Baker Hughes Holdings LLC, Houston, TX (US)

(72) Inventors: Andrew Tang, Camillus, NY (US); Kevin Coombs, Syracuse, NY (US); Brian Mittelstaedt, Fayetteville, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 473 days.

(21) Appl. No.: 18/072,149

(22) Filed: Nov. 30, 2022

(65) Prior Publication Data

US 2024/0173851 A1   May 30, 2024

(51) Int. Cl.
*B25J 9/10* (2006.01)
*B25J 13/00* (2006.01)
*G01D 11/30* (2006.01)

(52) U.S. Cl.
CPC ............ *B25J 9/1045* (2013.01); *B25J 13/00* (2013.01); *G01D 11/30* (2013.01)

(58) Field of Classification Search
CPC .......... B25J 9/1045; B25J 13/00; G01D 11/30
USPC ....................................................... 73/865.8
See application file for complete search history.

(56) References Cited

U.S. PATENT DOCUMENTS

| | | | | |
|---|---|---|---|---|
| 2008/0208001 A1* | 8/2008 | Hadani | .............. | A61B 1/00071 600/128 |
| 2012/0279323 A1* | 11/2012 | Broda | ................ | G02B 23/2492 73/865.8 |
| 2018/0104461 A1* | 4/2018 | Matlock | ................. | A61B 18/04 |
| 2020/0000316 A1* | 1/2020 | Ikeda | .................. | A61B 1/0005 |
| 2020/0129046 A1* | 4/2020 | Sinay | ................. | A61B 1/00135 |

\* cited by examiner

*Primary Examiner* — Peter J Macchiarolo
*Assistant Examiner* — Monica S Young
(74) *Attorney, Agent, or Firm* — Mintz, Levin, Cohn, Ferris, Glovsky and Popeo, P.C. US

(57) ABSTRACT

An inspection tube for non-destructive inspection including at least one variable stiffness section extending along a longitudinal axis between a proximal end and a distal end of the inspection tube, at least one stiff section, and a tensioning element. The at least one variable stiffness section can include a first end, a second end, and a plurality of serially-arranged linkages provided within the at least one variable stiffness section. The serially-arranged linkages can include a distal linkage provided at the second end. The at least one stiff section can be configured to couple to the first end or the second end of the at least one variable stiffness section. The tensioning element can include a first end coupled to the distal linkage and a second end extending through the serially-arranged linkages, and out of the proximal end of the inspection tube.

20 Claims, 11 Drawing Sheets

INDUSTRIAL BORESCOPE SYSTEM WITH ADJUSTABLE STIFFNESS INSERTION TUBE

BACKGROUND

The present invention relates to an industrial borescope for use in for non-destructive inspection.

Industrial borescopes can be used for inspection of industrial assets and equipment where an area to be inspected is inaccessible by other forms of inspection or devices, or where other such inspection would require destructive measures such as disassembly to be carried out. For example, such systems and equipment can include engines and turbines which, can be configured in environments ranging from, but not limited to, aerospace, automotive, and oil and gas production environments. During equipment operation, equipment may degrade or corrode or encounter general wear and tear that affects the effectiveness of the equipment. Industrial borescopes, and other forms of non-destructive inspection may be used to detect these undesirable equipment conditions.

Industrial borescopes can typically consist of a rigid or flexible tube with a display on one end, and a camera, or other sensor on the other end. The display and the sensor can be linked to one another by electrical or optical means (such as fiber optic cables). Some borescopes can be further configured to include mechanical or electrical articulation mechanisms, such as pull-wires and a motor. The articulation mechanism can allow for articulation of the inspection tip. A user can articulate the camera or other sensor within the asset being inspected in order to obtain a fuller view of the inspection environment.

SUMMARY

In one aspect, a system for use in non-destructive inspection is provided. In an embodiment, the system can include an inspection tube having a longitudinal axis extending between a proximal end and a distal end. The inspection tube can further include at least one variable stiffness section extending along the longitudinal axis between the proximal end and the distal end of the inspection tube. The at least one variable stiffness section can include a first end and a second end, the first end facing the proximal end of the inspection tube. The at least one variable stiffness section can further include a plurality of serially-arranged linkages provided within at least one variable stiffness section and extending along the longitudinal axis. The plurality of serially-arranged linkages can include a distal linkage provided at the second end of the at least one variable stiffness section. The inspection tube can further include at least one stiff section can be configured to extend along the longitudinal axis between the proximal end and the distal end of the inspection tube. The at least one stiff section can further be configured to couple to the first end or the second end of the at least one variable stiffness section. The inspection tube can further include a tensioning element including a first end and a second end. The first end of the tensioning element can be coupled to the distal linkage of the plurality of serially-arranged linkages and the second end of the tensioning element can be configured to extend through the plurality of serially-arranged linkages, along the longitudinal axis and out of the proximal end of the inspection tube.

In another embodiment, the system can further include a sensing section having a first end and a second end. The second end can include a sensor, and the sensing section can be configured to couple to the distal end of the inspection tube at the first end. The system can further include an inspection control unit configured to couple to the proximal end of the inspection tube. The inspection control unit can include at least one actuator coupled to the second end of the tensioning element. The system can further include a controller communicatively coupled to the at least one actuator and configured to cause the at least one actuator to adjust a longitudinal force exerted on the tensioning element extending through the plurality of serially-arranged linkages.

In another embodiment, movement of the at least one actuator of the system in a first direction can be configured to cause the tensioning element to reduce the longitudinal force exerted on the plurality of serially-arranged linkages to cause flexion of the at least one variable stiffness section. Movement of the at least one actuator in a second direction, opposite to the first direction, can be configured to cause the tensioning element to increase the longitudinal force exerted on the plurality of serially-arranged linkages to cause stiffening of the at least one variable stiffness section.

In another embodiment, the at least one actuator of the system can include a motor attached to a spool. In this embodiment, the tensioning element can be configured to unwind from the spool when the motor is actuated in the first direction and to wind around the spool when the motor is actuated in second direction opposite to the first direction.

In another embodiment, the at least one actuator of the system can be a knob attached to a spool. In this embodiment, the tensioning element can be configured to wind around the spool when the knob is actuated in one direction and configured to unwind from the spool when the knob is actuated in another direction.

In another embodiment, the plurality of serially-arranged linkages can be made from brass, aluminum, steel, ceramic, and/or plastic.

In another embodiment, the tensioning element can be a nitinol wire, and the system can further include a power supply configured to be communicatively coupled to the controller and to the nitinol wire. The controller can be configured to increase current provided by the power supply to cause the nitinol wire to contract in length, or the controller can be configured to decrease current provided by the power supply to cause the nitinol wire to extend in length.

In another embodiment, the plurality of serially-arranged linkages can be made from ceramic and/or plastic.

In another embodiment, the inspection control unit of the system can further include a computing device including a user interface configured to receive inputs to operate the inspection tube. The user interface can include one or more user interface objects operative to adjust the longitudinal force exerted on the longitudinal axis extending through the plurality of serially-arranged linkages.

In another embodiment, the inspection control unit can further comprise a display screen to display at least one of a stiffness value, a stiffness setting, a stiffness controller, and/or a preprogrammed mode.

In another embodiment, the at least one sensor can include a camera, a light, a temperature sensor, a proximity sensor, or a flow sensor.

In another aspect, a method for inspecting an asset is provided. In one embodiment, the method can include inserting an inspection tube of a borescope system into an asset to perform an inspection. The inspection tube can include a longitudinal axis extending between a proximal end and a distal end, and can further include at least one variable stiffness section extending along the longitudinal axis between the proximal end and the distal end of the inspection tube. The at least one variable stiffness section can include a first end and a second end. The first end can be configured to face the proximal end of the inspection tube. A plurality of serially-arranged linkages can be provided within at least one variable stiffness section and can be configured to extend along the longitudinal axis. The plurality of serially-arranged linkages can include a distal linkage that can be provided at the second end of the at least one variable stiffness section. The inspection tube can further include at least one stiff section configured to extend along the longitudinal axis between the proximal end and the distal end of the inspection tube and couple to the first end or the second end of the at least one variable stiffness section. The inspection tube can further include a tensioning element that can include a first end and a second end. The first end can be configured to couple to the distal linkage and the second end and can be configured to extend through the plurality of serially-arranged linkages and out of the proximal end of the inspection tube. The tensioning element can further be configured to couple to at least one actuator of the borescope system. The inspection tube can further include a sensing section including a first end and a second end. The second end can further include a sensor, and the sensing section can be configured to couple to the distal end of the inspection tube at the first end. The method can further include receiving, by a data processor of the borescope system, an input associated with at least one operation parameter of the inspection tube. The method can further include controlling, by the data processor responsive to the input, a longitudinal force exerted on the tensioning element along the longitudinal axis extending through the plurality of serially-arranged linkages.

In another embodiment, the method can include controlling the longitudinal force by rotating the at least one actuator in a first direction. Rotating the at least one actuator in a first direction can be configured to cause the tensioning element extending within the plurality of serially-arranged linkages to reduce the longitudinal force exerted on the plurality of serially-arranged linkages causing flexion of the at least one variable stiffness section. The method can also include rotating the at least one actuator in a second direction, opposite to the first direction. Rotating the at least one actuator in the second direction can cause the tensioning element to increase the longitudinal force exerted on the plurality of serially-arranged linkages to cause stiffening of the at least one variable stiffness section.

In another embodiment, the at least one actuator can be a motor attached to a spool. In this embodiment, the controlling can further include unwinding the tensioning element from the spool in the first direction or winding the tensioning element around the spool in the second direction.

In another embodiment, the at least one actuator can be a knob attached to a spool. In this embodiment, the controlling can further include unwinding the tensioning element from the spool when the knob is actuated in a third direction or winding the tensioning element around the spool when the knob is actuated in a fourth direction opposite to the third direction.

In another embodiment, the borescope system can further include a current source, and the tensioning element can be a nitinol wire communicatively coupled to the current source. In this embodiment, the controlling can further include increasing a current provided to the nitinol wire causing the tensioning element to increase the longitudinal force exerted on the plurality of serially-arranged linkages. The controlling can also include decreasing the current provided by to the nitinol wire causing the tensioning element to decrease longitudinal force exerted on the plurality of serially-arranged linkages.

In another embodiment, the method can include providing, by the data processor, the at least one operational parameter of the inspection tube for display on a display of the borescope system.

In another embodiment, the display of the borescope system can include a user interface configured to receive the input.

In another embodiment, the at least one operation parameter can include a stiffness value, a stiffness setting, and/or a preprogrammed mode.

In another embodiment, the at least one sensor can include a camera sensor, a light sensor, a temperature sensor, a proximity sensor, or a flow sensor.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Traditional borescope insertion tubes on the market today have a fixed rigidity or stiffness configured at the time of manufacture. One limitation of traditional borescopes can be their limited use in a wide variety of different applications. A borescope system that has been configured to have a pliant or flexible insertion tube can be easier to maneuver during inspection but may not include sufficient rigidity to be advanced within objects or materials that apply friction against the insertion tube, which can cause the insertion tube to buckle and/or bunch. A more rigid insertion tube can be advanced or pushed into an object or material under inspection more easily, but it can be more difficult to maneuver. Another problem with insertion tubes is that, when trying to span a large gap, they can fall into the gap.

The systems, apparatuses, and methods described herein can address the aforementioned shortcomings. For example, one or more embodiments of the system herein can include an insertion tube of a borescope that can include at least one stiff push tube sections, at least one variable stiffness section. In some embodiments, the system can further include a sensing section. In one embodiment, the at least one variable stiffness section can include a plurality of serially-arranged linkages, which can be coupled to an at least one actuator. The at least one actuator can be configured to adjust the stiffness of the plurality of serially-arranged linkages within the at least one variable stiffness section (and thus the insertion tube) while performing an inspection, based on the application or requirements of the inspection. The optional sensing section can also include at least one sensor used to acquire sensor data during the inspection. The system, apparatuses, and methods described herein can also include a user interface in communication with the at least one actuator. The user interface can include one or more user interface objects operative to control the at least one actuator to adjust the stiffness of the at least one variable stiffness section and/or the sensing section.

The current subject matter can advantageously provide a borescope system, including an insertion tube that can be controlled by an operator to adjust a stiffness of portions of the insertion tube for more effective and efficient navigation through an asset during inspection. The system, apparatuses, and methods described herein provide an operator greater control of the insertion tube to provide flexibility when maneuvering, while also providing rigidity, for example, when pushing or spanning a gap.

Figure 1:
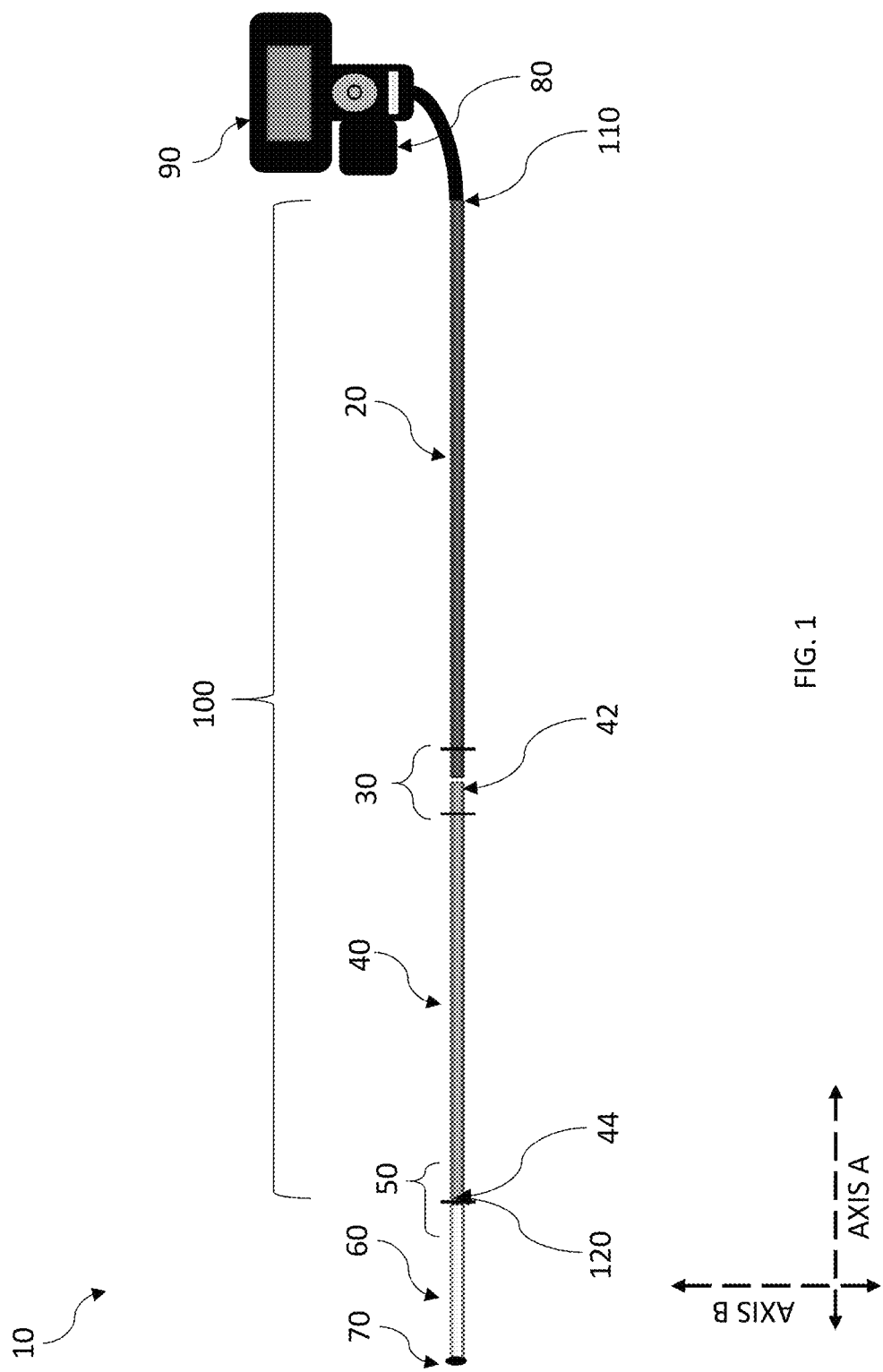
FIG. 1 illustrates one embodiment of a borescope system according to the subject matter described herein.

FIG. 1 illustrates an example embodiment of a borescope system 10 including an insertion tube 100. The insertion tube 100 can be made, for example, from a streel-braided monocoil tube and can have a proximal end 110 and a distal end 120. The insertion tube 100 can further include at least one stiff section 20 provided within the insertion tube 100, between the proximal end 110 and the distal end 120. The insertion tube 100 can further include at least one variable stiffness section 40 having a first end 42 and a second end 44. The at least one variable stiffness section 40 can be provided within the insertion tube 100, between the proximal end 110 and the distal end 120 and serially coupled to the at least one stiff section 20, for example, at connection 30. The at least one variable stiffness section 40 can be oriented with the first end 42 facing the proximal end 110. In some embodiments, the distal end 120 can be coincident with the second end 44 of the at least one variable stiffness section 40. In other embodiments, the ordering of the at least one stiff section 20 and the at least one variable stiffness section 40 can be switched, with the distal end 120 coinciding with an end of the at least one stiff section 20. In other embodiments, the insertion tube 100 can include a plurality of stiff sections 20 and/or a plurality of variable stiffness sections 40 connected serially in a predetermined order. In some embodiments, the borescope system 10 can further a sensing section 60 having a sensing end 70, the sensing section 60 further including a sensor coupled to the sensing end 70. In some embodiments, the sensing section 60 can be coupled to the distal end 120 of the insertion tube at an end opposite the sensing end 70. Each of the at least one stiff section 20, the at least one variable stiffness section 40, and the sensing section 60 can have a different stiffness and/or be made from different materials to produce different desired flexibilities for a respective section. In some embodiments, the change in stiffness between sections can be achieved with varying braid angles and/or monocoil geometry. In some embodiments, the coupling at connection 30 can be made by butting an end of the at least one stiff section 20 and an end of the at least one variable stiffness section 40 together around a solid connector (shown in FIG. 8). In some embodiments, the connected end of the at least one stiff section 20 and the at least one variable stiffness section 40 can be tied down with Kevlar thread & epoxied around the solid connector. In some embodiments, the distal end 120 of the insertion tube 100 can be coupled to the sensing section 60 at connection 50. In some embodiments, the coupling at connection 50 can be made in the same way as the connection 30. In other embodiments, the connection 50 can be made using a combination of press fitting and epoxies. In other embodiments, the connections 30 and 50 could be made using, for example, laser welding and/or mechanical interlocks.

Figure 4:
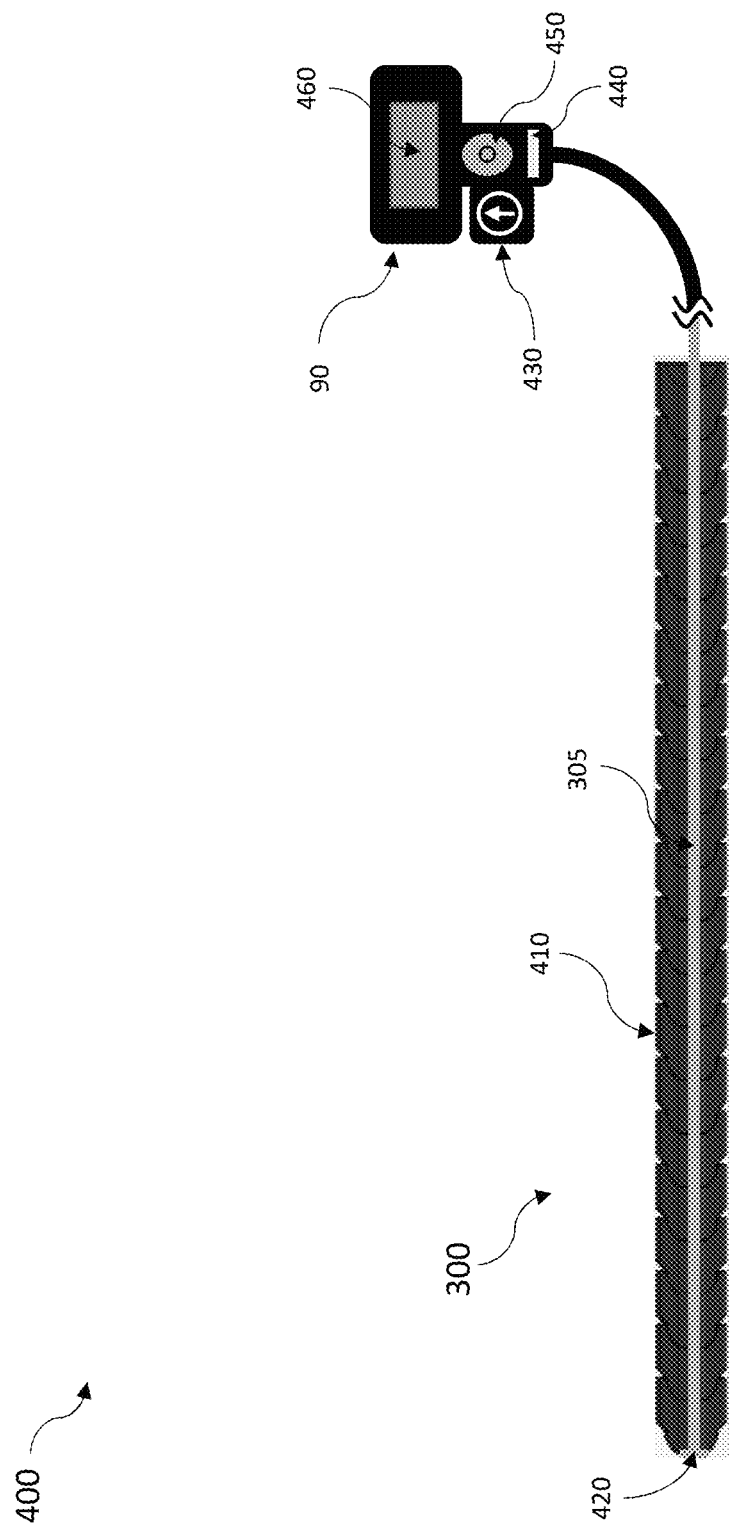
FIG. 4 illustrates one embodiment of the borescope system of FIG. 1 wherein a plurality of serially-arranged linkages are actuated by an electrified nitinol wire according to the subject matter described herein.
Figure 5:
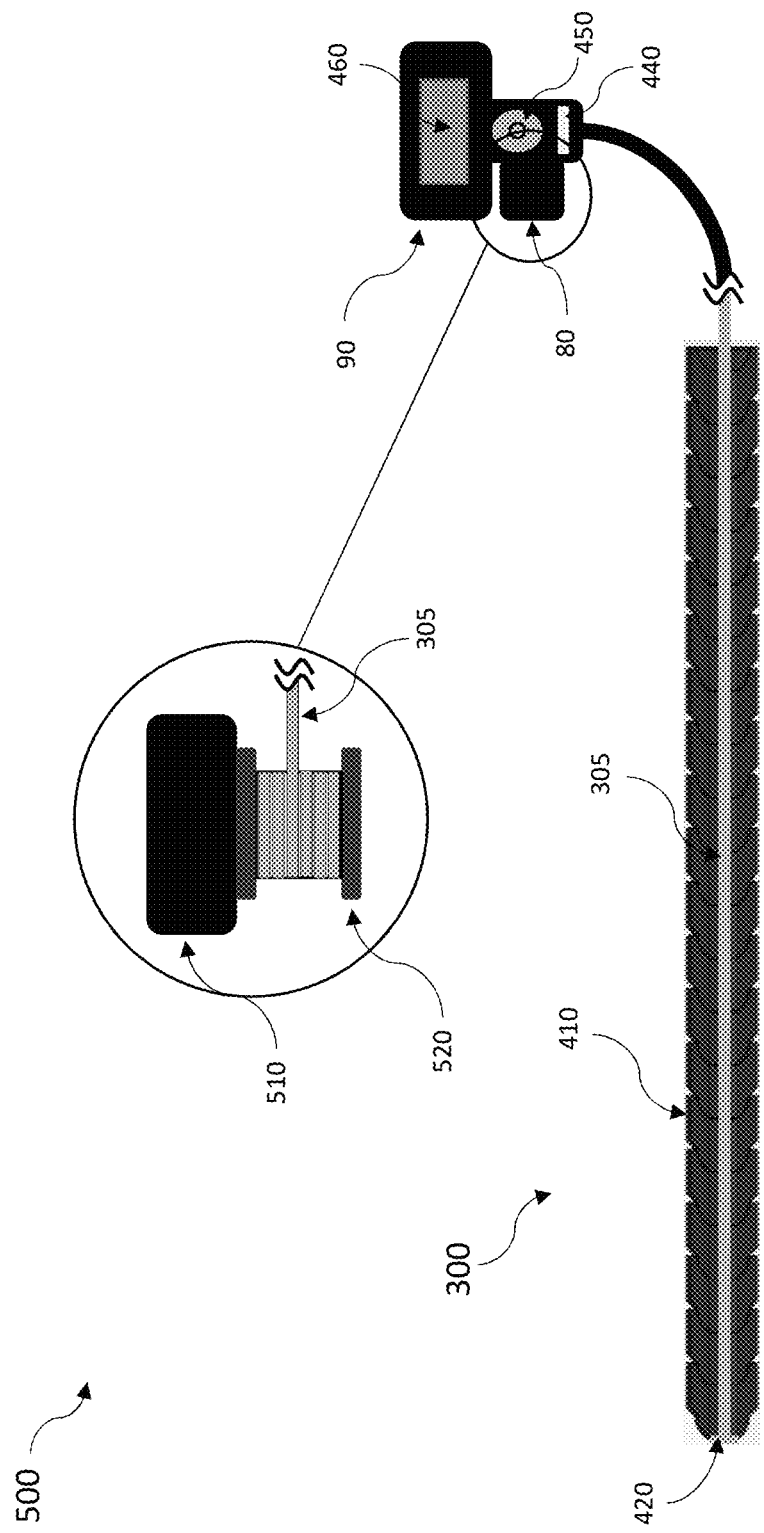
FIG. 5 illustrates another embodiment of the borescope system of FIG. 1 wherein a plurality of serially-arranged linkages are actuated by a tensioning element and a motor according to the subject matter described herein.
Figure 6:
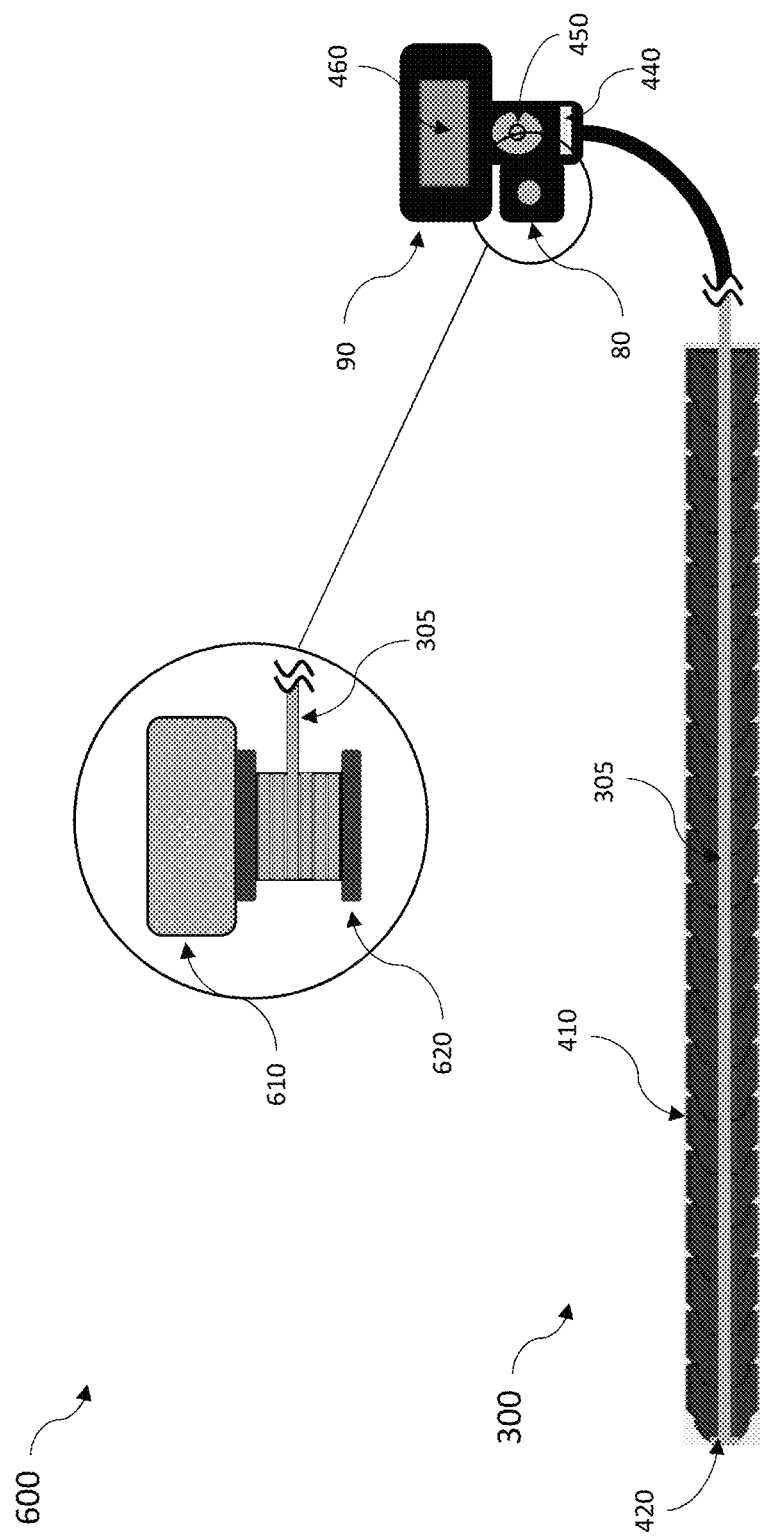
FIG. 6 illustrates another embodiment of the borescope system of FIG. 1 wherein a plurality of serially-arranged linkages are actuated by a tensioning element and a knob according to the subject matter described herein.

The insertion tube 100 can further be connected to at least one actuator 80 and a borescope computing device 90 (discussed in FIGS. 4-6). The at least one actuator 80 can be configured to control a stiffness of the at least one variable stiffness section 40 (discussed in detail below in reference to FIGS. 4-10). In some embodiments, a plurality of variable stiffness sections 40 can be controlled by a plurality of actuators 80. The borescope computing device 90 can be an inspection control unit, which when coupled to the insertion tube 100 can form a borescope or a visual inspection system, such as the borescope system 10. In some embodiments, the at least one actuator 80 may be configured to be integral with the borescope computing device 90. In some embodiments, the borescope computing device 90 can further be communicatively coupled to the sensing section 60, including the sensor at the sensing end 70. In some embodiments, the sensor at the sensing end 70 can include a camera, a light, a temperature sensor, a proximity sensor, or a flow sensor, or a combination thereof.

Figure 2:
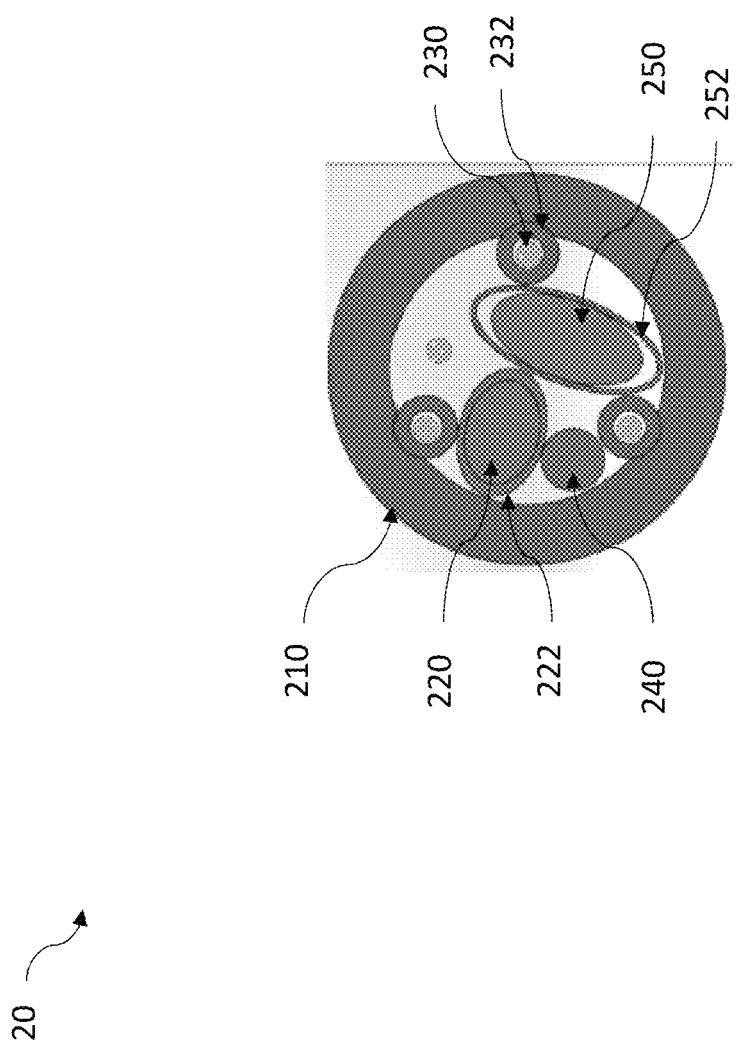
FIG. 2 is a cross-sectional view of the at least one stiff section of the insertion tube of the borescope system of FIG. 1.

FIG. 2 illustrates a cross-sectional view taken along axis B of FIG. 1 of an embodiment of the at least one stiff section 20 of the insertion tube 100 described in FIG. 1. As shown in FIG. 2, the at least one stiff section 20 of the insertion tube 100 can include a first conduit 210 housing an imager harness 220 having an imager jacket 222, a plurality of articulation cables 230 for articulating the sensor articulation assembly and having sheaths 232, a phase-measure (PM) contact harness 240, a fiber optic cable bundle 250 having a jacket 252. Each of the imager harness 220, the plurality of sheathed articulation cables 230, the phase-measure (PM) contact harness 240 and the fiber optic cable bundle 250 can be configured to extend from the borescope computing device 90 through the insertion tube 100 and the sensing section 60 and terminate at the sensing end 70.

In some embodiments, the conduit 210 of section 20 can be made from a stainless steel monocoil, a polyurethane jacket, a tungsten braid, and/or a polyurethane coating.

Imager harness 220 can be configured to connect, for example, a camera in the sensor at the sensing end 70 to the electronics of the borescope 90 in order to produce an image. In some embodiments, the imager jacket 222 can be made from Teflon.

The plurality of sheathed articulation cables 230 can be configured to articulate a sensor articulation assembly provided in the sensing section 60. The cables 230 can connect the sensor at the sensing end 70 to a sensing end actuator within the borescope computing device 90. In some embodiments, the sensing end actuator can include one or more cams that cables 230 can be wound around. The sensing end actuator can be controlled by a controller within the borescope computing device 90. The controller can provide control signals to the sensing end actuator to cause the cables 230 to be wound around the cams. By winding the cables 230 around their respective cam more or less than others, a user can produce different levels of tension within the sensing section 60 and cause bending of the sensing section 60 in a controlled articulation manner. In some embodiments, the plurality of cables 230 can be made from tungsten. Additionally, in some embodiments, the cable sheaths 232 can be made from stainless steel.

The phase-measure (PM) contact harness 240 can be configured to provide the borescope system 10 with a capability to identify PM tips as they are attached to a camera in the sensor at the sensing end 70.

The fiber optic cable bundle 250 can be configured to transmit information in the form of light, from the sensor at the sensing end 70 to a computing system of the borescope computing device 90. In some embodiments, the fiber optic cable jacket 252 can be made from a PVC material.

Figure 3:
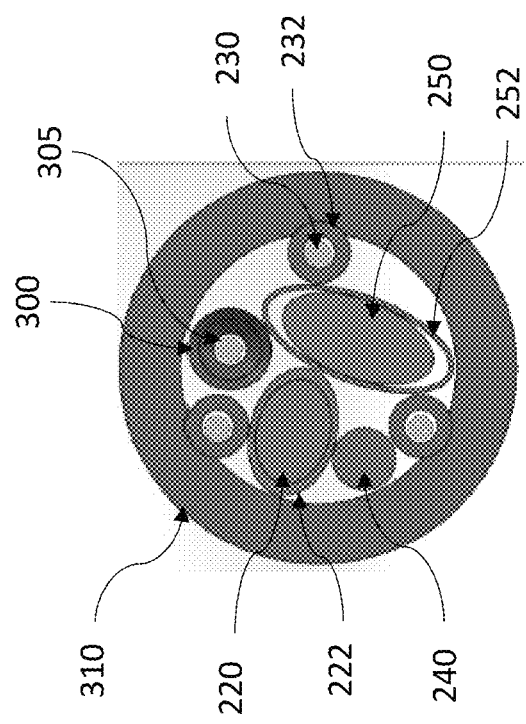
FIG. 3 is a cross-sectional view of the at least one variable stiffness section of the insertion tube of the borescope system of FIG. 1.

FIG. 3 illustrates a cross-sectional view taken along axis B of FIG. 1 of an embodiment of the at least one variable stiffness section 40 of the insertion tube 100 described in relation to FIG. 1. As shown in FIG. 3, the at least one variable stiffness section 40 can include a plurality of serially-arranged linkages 300 located within a second conduit 310. The plurality of serially-arranged linkages 300 may be arranged along a longitudinal axis (e.g., axis A of FIG. 1) of the insertion tube 100 and can be coupled to the at least one actuator 80 by the tensioning element 305. The plurality of serially-arranged linkages 300, the tensioning element 305, and the at least one actuator 80 can be configured to vary the stiffness of the at least one variable stiffness section 40 of the insertion tube 100 and will be discussed further in regard to FIGS. 4-6. In some embodiments, where at least one stiff section 20 is provided in between at least one variable stiffness section 40 and the at least one actuator 80, the at least one stiff section 20 described in FIG. 2 can further include the tensioning element 305 configured to extend through the at least one stiff section 20 to couple the at least one actuator 80 to the at least one variable stiffness section 40. The second conduit 310 can be configured to have a different stiffness than the first conduit 210. In some embodiments, the at least one variable stiffness sections 40 can be configured to have a thinner monocoil design than the at least one stiff section 20. In some embodiments, conduit 310 of the at least one variable stiffness section 40 can be made from a stainless steel monocoil, a polyurethane jacket, one or more layers of a tungsten braid, and/or a polyurethane coating.

FIG. 4 illustrates a cross-sectional view corresponding to axis A of FIG. 1 showing one embodiment of the plurality of serially-arranged linkages 300 described in FIG. 3. As shown, the plurality of serially-arranged linkages 300 can include individual links 410 and a tensioning element 305 can extend through a lumen provided within the links 410. In some embodiments, the links 410 can be simple cylindrical beads. In other embodiments, the links 410 can take the form of other interlocking shapes, some of which can be seen in FIGS. 7A and 7B. The tensioning element 305 may be terminated at or be coupled to a distal linkage 420 of the plurality of serially-arranged linkages 300. In some embodiments, the distal linkage 420 can be provided at the second end of the at least one variable stiffness section 40 (described in relation to FIG. 1). In this embodiment the links 410 may be made from a ceramic material and the tensioning element 305 can be made from nitinol wire. In some embodiments, the nitinol wire 305 can be a 2-way linear actuator nitinol wire. 2-way linear actuator nitinol wire can be pre-programmed to remember its martensite shape (i.e. its cold shape). In some embodiments, the 2-way linear actuator nitinol wire 305 can be pre-programmed to have a straight martensite shape, allowing for the nitinol wire 305 to be flexible when a current is supplied to the nitinol wire 305 and it is heated, and then straighten when current is switched off and the nitinol wire 305 cools. Having a straight pre-programmed martensite shape allows the nitinol wire 305 to be used without a spring-back in linear actuator applications. In some embodiments, the nitinol can have an actuation temperature of 50 degrees C. In this embodiment, the nitinol tensioning element 305 can be coupled to a power supply 430. The power supply 430 can be configured to provide an electrical current to the nitinol tensioning element 305. In this embodiment, the power supply 430 may be integrally within the borescope computing device 90. The power supply 430 can be controlled by a controller 440. The controller 440 can be provided integrally within the borescope computing device 90, or can be provided separately. In some embodiments, the controller 440 can be configured to receive inputs from the pointing device 450 and/or a user interface display 460 of the borescope computing device 90. In other embodiments, the controller 440 can be configured to receive inputs from other devices that can be communicatively coupled to the borescope computing device 90. In some embodiments, the user interface display 460 can be a touchscreen.

In the embodiment illustrated by FIG. 4, the controller 440 can be configured to send a signal from an input to the power supply 430 to vary the amount of current supplied to the nitinol tensioning element 305 in order to adjust a longitudinal force exerted on the plurality of serially-arranged linkages 300. When the current supplied to the nitinol tensioning element 305 is increased, resistance within the tensioning element can be increased, which can cause an increase in temperature. As the nitinol tensioning element 305 increases in temperature, it can be configured to contract and can shorten in length. Contracting of the tensioning element 305 can cause the links 410 to be drawn together due to the increased longitudinal force exerted on the plurality of serially-arranged linkages 300 between the distal linkage 420 and the power supply 430. This can stiffen the plurality of serially-arranged linkages 300 which can to form a more rigid configuration as the links 410 abut one another. Alternatively, the controller 440 can be configured to send a signal to decrease the current supplied to the tensioning element 305 from the power supply 430. With less current supplied, resistance within the tensioning element 305 can be decreased, which can cause a decrease in temperature. As the tensioning element 305 cools, it can be configured to elongate and can return to its original length, which can cause the links 410 to disengage from contact with one another which can cause the plurality of serially-arranged linkages 300 to loosen to form a more flexed configuration. In this embodiment, the links 410 can be formed as ceramic beads to insulate portions of the at least one variable stiffness section 40 from heat generated by the nitinol tensioning element 305. In some embodiments, the links 410 can be formed from plastic or anodized aluminum.

FIG. 5 is a cross-sectional view corresponding to axis A of FIG. 1 showing another embodiment of the plurality of serially-arranged linkages 300 described in FIG. 3. As shown in FIG. 5, the plurality of serially-arranged linkages 300 can further include links 410, tensioning element 305 which can be configured to extend through a lumen one or more links 410 of the plurality of serially-arranged linkages 300. The tensioning element 305 may be terminated at or be coupled to a distal linkage 420 of the at least one variable stiffness section 40. In some embodiments, the distal linkage 420 can be provided at the second end of the at least one variable stiffness section 40 (described in relation to FIG. 1). In this embodiment the links 410 may be made from brass, steel, plastic, and/or aluminum. In this embodiment, the tensioning element 305 can be made from tungsten, and/or stainless steel. In some embodiments, the tensioning element 305 can be coated in Teflon. The tensioning element 305 may be coupled to an at least one actuator 80. In this embodiment, the at least one actuator 80 can further include a motor 510 coupled to a spool 520. In this embodiment, the at least one actuator 80 may be provided integrally with the borescope computing device 90, or it may be provided separately. The at least one actuator 80 can be configured to be controlled by a controller 440. In some embodiments, the controller 440 can be configured to receive inputs from the pointing device 450 and/or the user interface display 460 of the borescope computing device 90. In other embodiments, the controller 440 can be configured to receive inputs from other devices communicatively coupled to the borescope computing device 90.

In the embodiment illustrated by FIG. 5, the motor 510 can be configured to wind the tensioning element 305 around the at least one actuator spool 520 in order to shorten or lengthen the tensioning element 305 within the at least one variable stiffness section 40. The controller 440 can be configured to send a signal from an input to the motor 510 which can rotate the spool 520 to cause the tensioning element 305 to be wound around the spool 520. When the tensioning element 305 is spooled around the spool 520, the links 410 can be drawn into contact with one another which can increase the stiffness of the plurality of serially-arranged linkages 300 within the at least one variable stiffness section 40. Alternatively, the controller 440 may be configured to send a signal from an input to the motor 510 to release the tensioning element 305 from the spool 520. As a result, tension on the tensioning element 305 can be reduced and slack can be introduced into the plurality of serially-arranged linkages 300. In this way, flexion of the plurality of serially-arranged linkages 300 can be increased and the stiffness of the at least one variable stiffness section 40 can be reduced.

FIG. 6 is a cross-sectional view of another embodiment of the plurality of serially-arranged linkages 300. As shown in FIG. 6, the plurality of serially-arranged linkages 300 can include links 410, and tensioning element 305, which can be configured to extend through a lumen within the links 410. The tensioning element 305 may be terminated at or be coupled to a distal linkage 420 of the plurality of serially-arranged linkages 300. In some embodiments, the distal linkage 420 can be provided at the second end of the at least one variable stiffness section 40 (described in relation to FIG. 1). In this embodiment the links 410 may be made from brass, steel, plastic, and/or aluminum. In this embodiment, the tensioning element 305 can be made from tungsten, and/or stainless steel. In some embodiments, the tensioning element 305 can be coated in Teflon. The tensioning element 305 may be coupled to an at least one actuator 80. In this embodiment, the at least one actuator 80 can further include a knob 610 coupled to a spool 620. In this embodiment, the at least one actuator 80 may be provided integrally with the borescope computing device 90, or may be provided separately, for example, mounted to the housing of the insertion tube 100.

The spool 620 can rotate in response to rotation of the knob 610 and can release or retract the tensioning element 305. Rotating the knob 610 in a first direction can cause the tensioning element 305 to be wound around the spool 620. When the tensioning element 305 is spooled around the spool 620, the links 410 can be drawn into contact with one another which can increase the stiffness of the plurality of serially-arranged linkages 300 within the at least one variable stiffness section 40. Alternatively, rotating the knob 610 in a second direction, opposite to the first direction, can release the tensioning element 305 from the spool 620. As a result, tension on the tensioning element 305 can be reduced and slack can be introduced into the plurality of serially-arranged linkages 300. In this way, flexion of the plurality of serially-arranged linkages 300 can be increased and the stiffness of the at least one variable stiffness section 40 can be reduced. In this embodiment, the knob 610 can be configured to be manually operated by a user to tighten or loosen the tensioning element 305 within the plurality of serially-arranged linkages 300. In some embodiments, the knob 610 can alternatively be a slider or a switch.

Figure 7B:
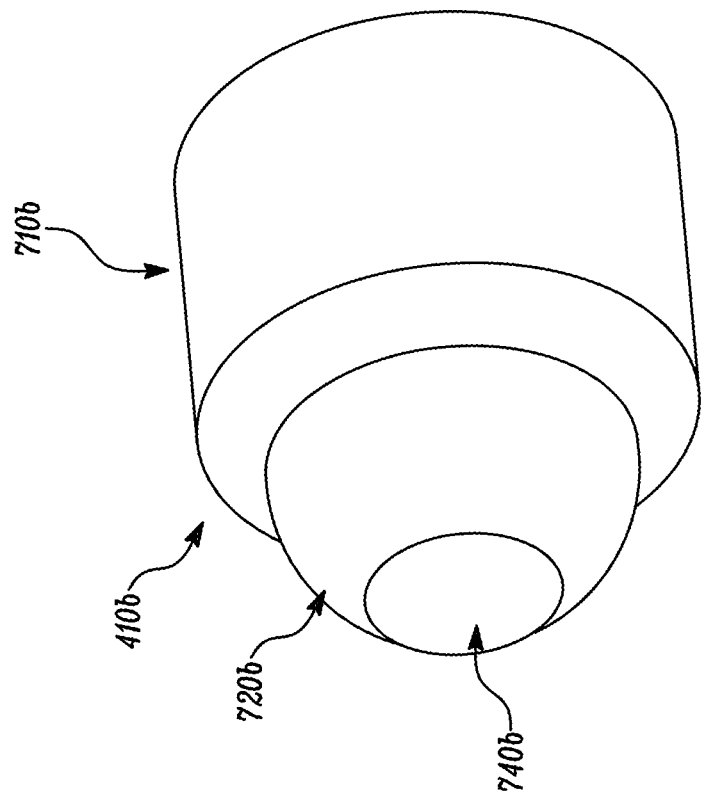
FIG. 7B illustrates a second example embodiment of an individual link of the plurality of serially-arranged linkages described in relation to FIG. 3 according to the subject matter described herein.
Figure 7A:
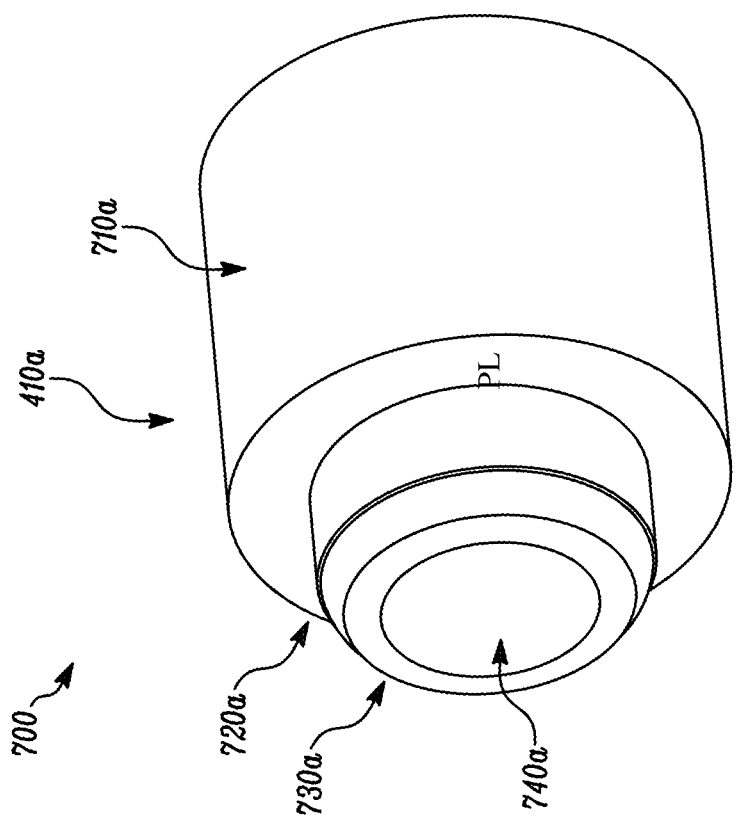
FIG. 7A illustrates a first example embodiment of an individual link of the plurality of serially-arranged linkages described in relation to FIG. 3 according to the subject matter described herein.

FIGS. 7A and 7B illustrates two example embodiments of the links 410 that make up the plurality of serially-arranged linkages 300. As shown in FIG. 7A, the link 410a can include a cylindrically-shaped body 710a and a cylindrically-shaped protrusion 720a extending from the body 710a. The protrusion 720a can include a tapered collar 730a having a sloped surface. The protrusion 720a of a first link 410 can be received within the body 710a of a second link 410 that is adjacent to the first link 410. The sloped surface of the collar 730a can enable flexion of adjacent links 410 allowing the plurality of links 300 to bend or flex as needed. The link 410a can also include a lumen 740a extending through the link 410a. The lumen 740a can convey the tensioning element 305 therein.

As shown in FIG. 7B, the link 410b can include a cylindrically-shaped body 710b and a dome-shaped protrusion 720b extending from the body 710b. The protrusion 720b of a first link 410 can be received within the body 710b of a second link 410 that is adjacent to the first link 410. The dome-shaped protrusion 720b can enable flexion of adjacent links 410 allowing the plurality of links 300 to bend or flex as needed. The link 410b can also include a lumen 740b extending through the link 410b. The lumen 740b can convey the tensioning element 305 therein.

Figure 8:
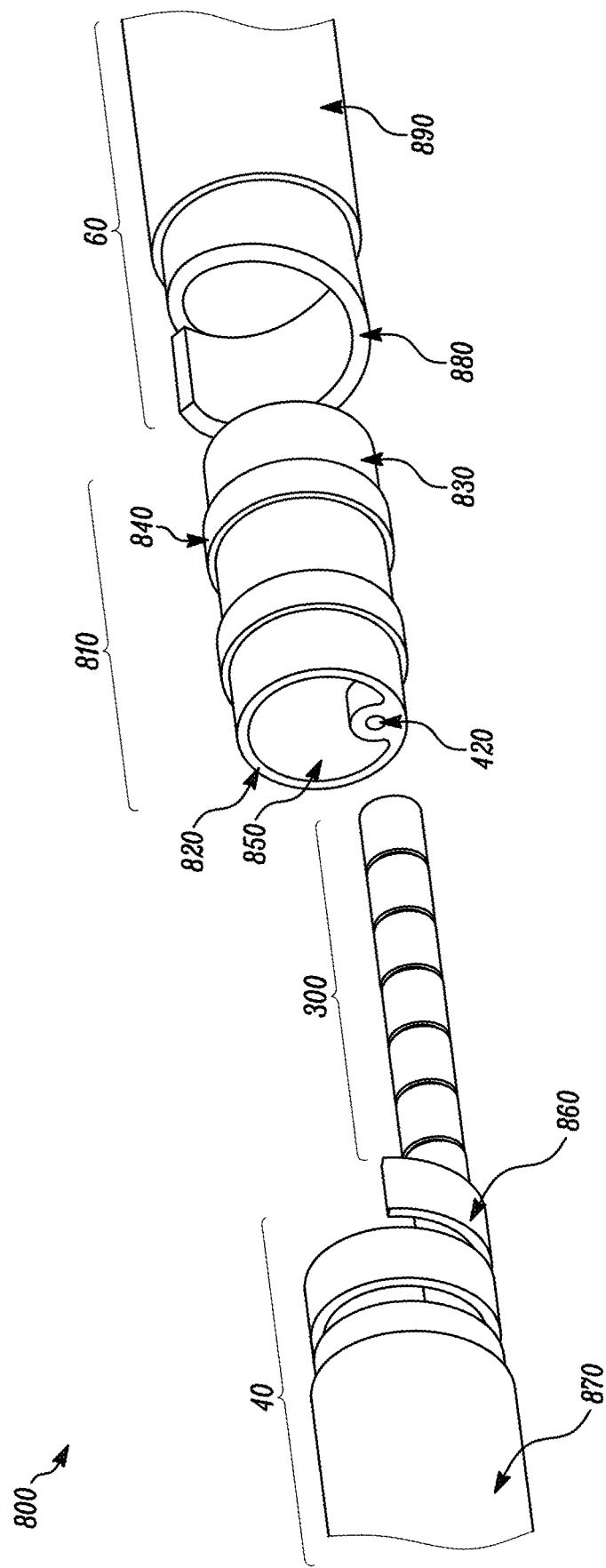
FIG. 8 illustrates an example embodiment of a coupling of the borescope system of FIG. 1 according to the subject matter described herein.

FIG. 8 illustrates an example of a connection 800 between the at least one variable stiffness section 40 and the sensing section 60, described in relation to FIG. 1. However, in some embodiments, connection 800 can be provided between the at least one variable stiffness section 40 and the at least one stiff section 20. For the following description, the connection 800 will be described as a connection between the at least one variable stiffness section 40 and the sensing section 60. In this embodiment, the at least one variable stiffness section 40 can include a monocoil 860 and a jacket 870. The sensing section 60 can include a monocoil 880 and a jacket 890. In this embodiment, the connection 800 can further include a coupling 810 having a first end 820 and a second end 830. The coupling 810 can have a cylindrically-shaped body and include a plurality of cylindrically-shaped ridges 840 extending, concentrically, from the cylindrically shaped body of the coupling 810. The coupling 810 can also include a lumen 850 extending through the coupling. The lumen 850 can convey the imager harness 220, the plurality of sheathed articulation cables 230, the phase-measure (PM) contact harness 240 and the fiber optic cable bundle 250 (described in relation to FIG. 3) from the at least one variable stiffness section 40 into the sensing section 60. Further, the distal linkage 420 of the plurality of serially-arranged linkages 300 can be configured to mount to the lumen of the 850 of the coupling 810 at the first end 820. Alternatively, the distal linkage 420 can be machined integrally with the coupling 810. In some embodiments, a section of the monocoil 860 near the first end 820 and a section of the monocoil 880 near the second end 830 can be cut out to form a space for the coupling 810 to slide into. The coupling 810 can then be covered by the jacket 870 and the jacket 890. In some embodiments, the jacket 870 and the jacket 890 can be polyurethane jackets and tungsten braid(s). The coupling 810 covered by the jacket 870 and the jacket 890 can then be tied down with Kevlar thread around the cylindrically-shaped ridges 840 of the coupling 810 which provide grip. Epoxy can then be applied around the thread and smoothed to form a smooth connection 800.

Figure 9:
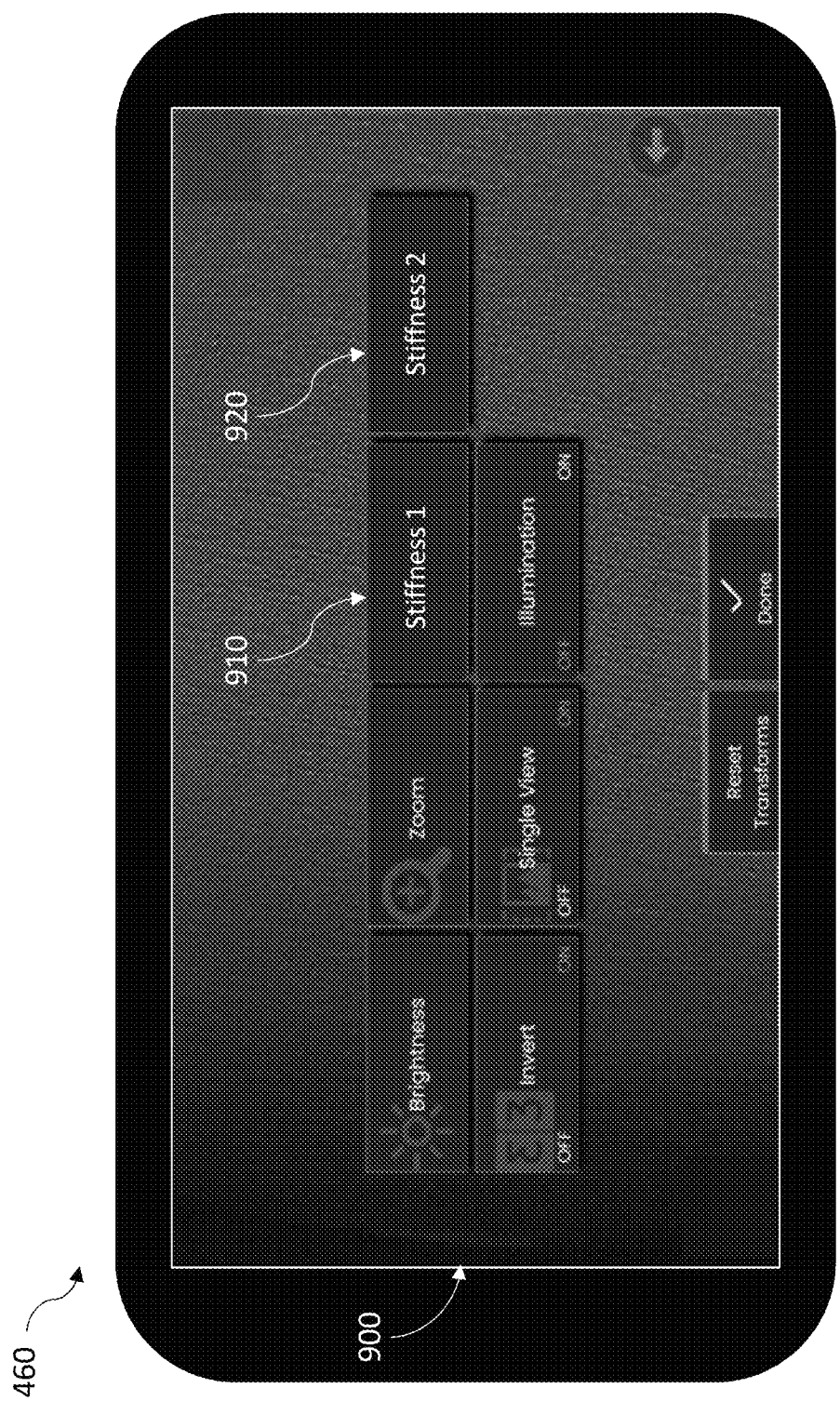
FIG. 9 illustrates an example of a settings screen of a user interface display of the borescope system of FIG. 1 according to the subject matter described herein.

FIG. 9 illustrates an example embodiment of a settings screen 900 the user interface display 460. The user interface display 460 can be communicatively coupled to a computing device (i.e. the borescope computing device 90) and can be further coupled to a controller (i.e. controller 440). The user interface display 460 can be configured to display user inputs that control the operation of the borescope device 10. In some embodiments, the settings screen 900 can be configured to display at least one stiffness control window 910 and/or 920. Each stiffness control window 910 and/or 920 can be configured to control at least one variable stiffness section 40. In some embodiments, the user interface display 460 can be configured to expand the stiffness control window 910 and/or 920 responsive to an input (i.e. touching/clicking the control window 910 and/or 920).

Figure 10:
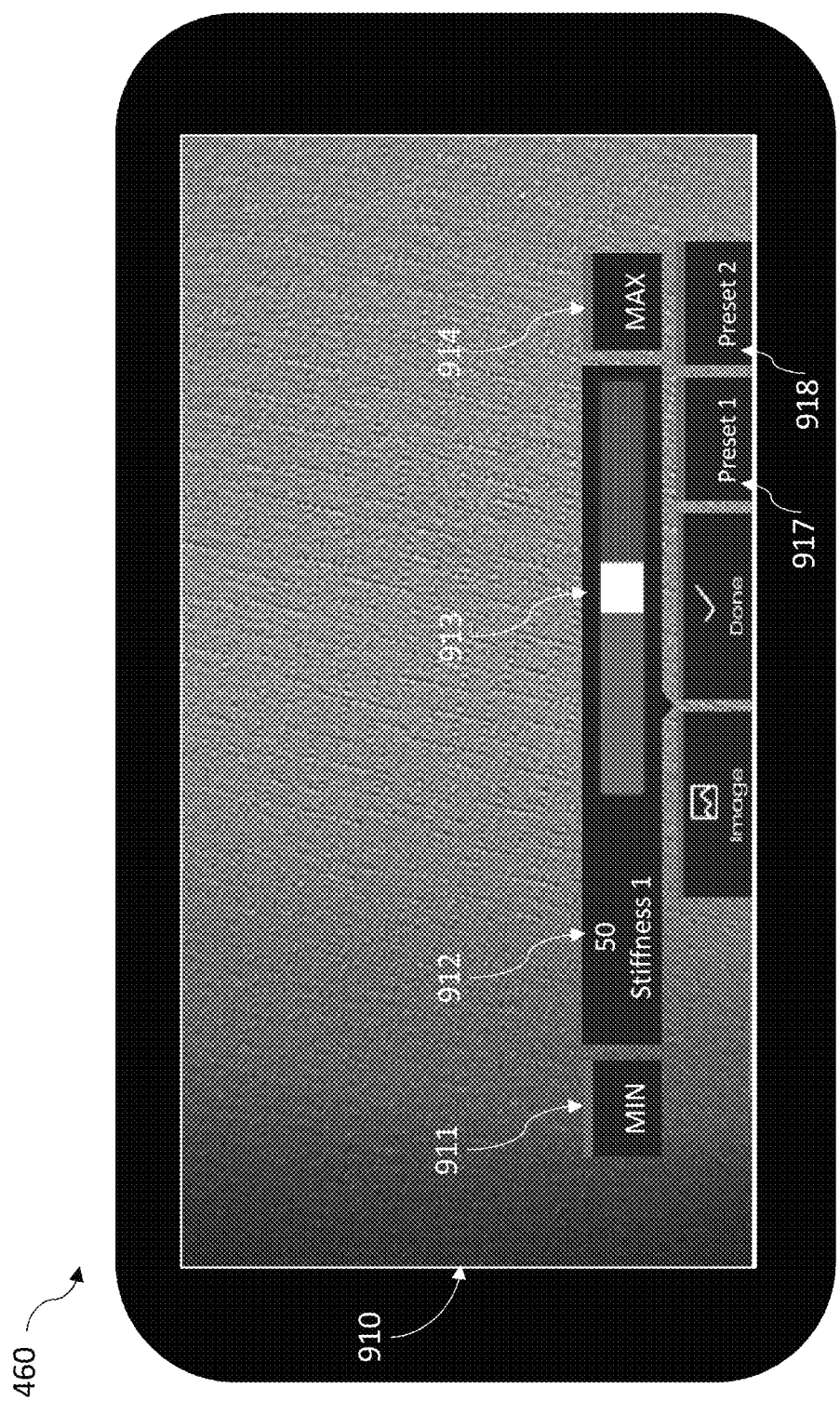
FIG. 10 illustrates an example of a stiffness control window of a user interface display of the borescope system of FIG. 1 according to the subject matter described herein.

FIG. 10 illustrates an example embodiment of the expanded stiffness control window 910. In some embodiments, the expanded stiffness control window 910 can include a plurality of operational parameters configured to control at least one variable stiffness section 40. In some embodiments, the plurality of operational parameters can include a stiffness setting, such as a minimum stiffness 911 and/or a maximum stiffness 914. In some embodiments, responsive to selecting a stiffness setting 911, the controller 440 coupled to the user interface display 460 can be configured to send a control signal to the actuator 80 causing the actuator 80 to reduce the longitudinal force applied to the tensioning element 305 to a predetermined minimum value. Alternatively, responsive to selecting a stiffness setting 914, the controller 440 coupled to the user interface display 460 can be configured to send a control signal to the actuator 80 causing the actuator 80 to increase the longitudinal force applied to the tensioning element 305 to a predetermined maximum value. In some embodiments, the plurality of operational parameters can further include a stiffness value 912. In some embodiments, the stiffness value 912 can be a value between 1-100 with 0 being the predetermined minimum value and 100 being the predetermined maximum value. In some embodiments, the stiffness value 912 can be changed using a stiffness controller 913. In some embodiments, the stiffness controller 912 can be a virtual slide controller displayed on a touchscreen. In other embodiments, the stiffness controller 912 can be a physical slide controller. In other embodiments, the stiffness value 912 can be changed in other ways, for example, using the knob 610 described in FIG. 6. In other embodiments, the plurality of operational parameters can further include at least one preprogrammed mode 917 and/or 918. In some embodiments, the at least one preprogrammed mode (Preset 1) 917 and/or (Preset 2) 918 can be set by a user. In some embodiments, where the user interface display 460 is a touchscreen, a preprogrammed mode 917 can be set, for example, by sliding the slide controller 913 to a desired stiffness value 912 and then pressing, and holding the preprogrammed mode 917 for a predetermined amount of time.

Figure 11:
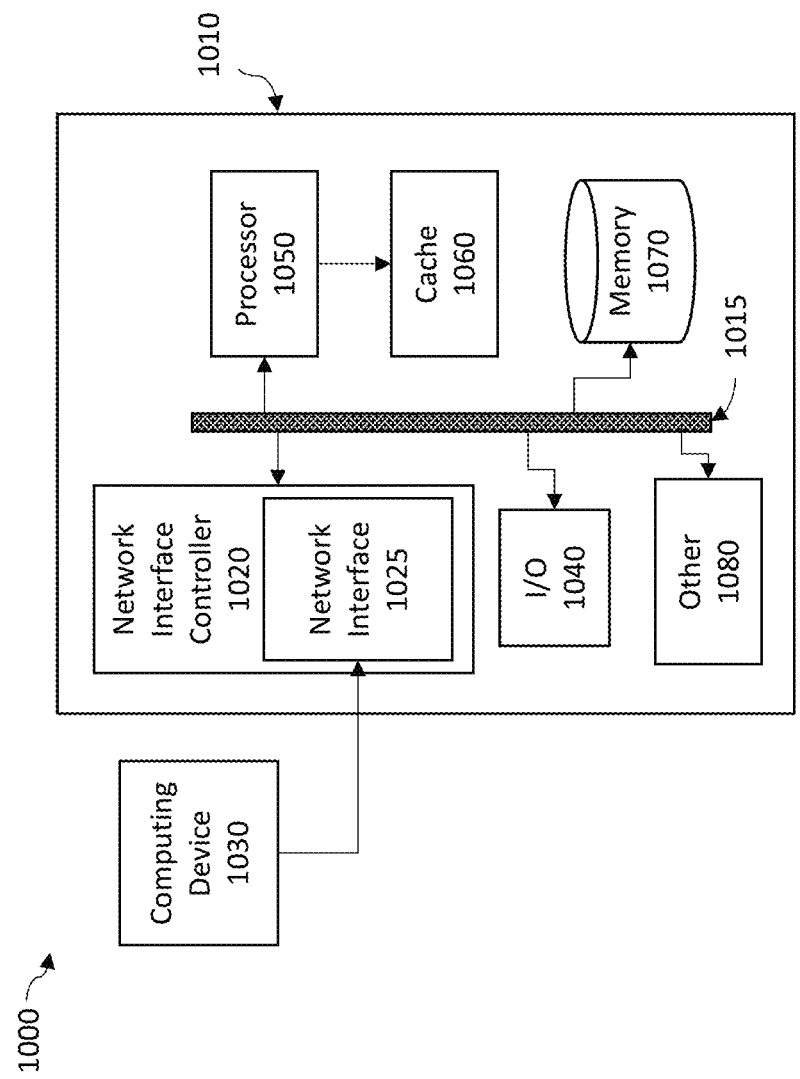
FIG. 11 is a block diagram of a computing system suitable for use in implementing the computerized components of the borescope system of FIG. 1 according to the subject matter described herein.

FIG. 11 is a block diagram 1000 of a computing system 1010 suitable for use in implementing the computerized components described herein, such as the borescope computing device 90. In broad overview, the computing system 1010 includes at least one processor 1050 for performing actions in accordance with instructions, and one or more memory devices 1060 and/or 1070 for storing instructions and data. The illustrated example computing system 1010 includes one or more processors 1050 in communication, via a bus 1015, with memory 1070 and with at least one network interface controller 1020 with a network interface 1025 for connecting to external devices 1030, e.g., a computing device. The one or more processors 1050 are also in communication, via the bus 1015, with each other and with any I/O devices 1030 at one or more I/O interfaces 1030, and any other devices 1080. The processor 1050 illustrated incorporates, or is directly connected to, cache memory 1060. Generally, a processor will execute instructions received from memory. In some embodiments, the computing system 1010 can be configured within a cloud computing environment, a virtual or containerized computing environment, and/or a web-based microservices environment.

In more detail, the processor 1050 can be any logic circuitry that processes instructions, e.g., instructions fetched from the memory 1070 or cache 1060. In many embodiments, the processor 1050 is an embedded processor, a microprocessor unit or special purpose processor. The computing system 1010 can be based on any processor, e.g., suitable digital signal processor (DSP), or set of processors, capable of operating as described herein. In some embodiments, the processor 1050 can be a single core or multi-core processor. In some embodiments, the processor 1050 can be composed of multiple processors.

The memory 1070 can be any device suitable for storing computer readable data. The memory 1070 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 1010 can have any number of memory devices 1070.

The cache memory 1060 is generally a form of high-speed computer memory placed in close proximity to the processor 1050 for fast read/write times. In some implementations, the cache memory 1060 is part of, or on the same chip as, the processor 1050.

The network interface controller 1020 manages data exchanges via the network interface 1025. The network interface controller 1020 handles the physical, media access control, and data link layers of the Open Systems Interconnect (OSI) model for network communication. In some implementations, some of the network interface controller's tasks are handled by the processor 1050. In some implementations, the network interface controller 1020 is part of the processor 1050. In some implementations, a computing device 1010 has multiple network interface controllers 1020. In some implementations, the network interface 1025 is a connection point for a physical network link, e.g., an RJ 45 connector. In some implementations, the network interface controller 1020 supports wireless network connections via network interface port 1025. Generally, a computing device 1010 exchanges data with other network devices 1030, such as computing device 1030, via physical or wireless links to a network interface 1025. In some implementations, the network interface controller 1020 implements a network protocol such as LTE, TCP/IP Ethernet, IEEE 802.11, IEEE 802.16, or the like.

The other computing devices 1030 are connected to the computing device 1010 via a network interface port 1025. The other computing device 1030 can be a peer computing device, a network device, or any other computing device with network functionality. For example, a computing device 1030 can be a remote controller, or a remote display device configured to communicate and operate the borescope system 10 remotely. In some embodiments, a computing device 1030 can include a server or a network device such as a hub, a bridge, a switch, or a router, connecting the computing device 1010 to a data network such as the Internet.

In some uses, the I/O interface 1030 supports an input device and/or an output device (not shown). In some uses, the input device and the output device are integrated into the same hardware, e.g., as in a touch screen. In some uses, such as in a server context, there is no I/O interface 1030 or the I/O interface 1030 is not used. In some uses, additional other components 1080 are in communication with the computer system 1010, e.g., external devices connected via a universal serial bus (USB).

The other devices 1080 can include an I/O interface 1040, external serial device ports, and any additional co-processors. For example, a computing system 1010 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 1010, e.g., a touch screen on a tablet device. In some implementations, a computing device 1010 includes an additional device 1080 such as a co-processor, e.g., a math co-processor that can assist the processor 1050 with high precision or complex calculations.

The system and apparatuses include a borescope system, including a variably adjustable insertion tube that can provide precision control of a borescope system in locations or equipment which can be difficult to navigate using traditional, rigid borescope insertion tubes. Advantageously, the ability to collect a broader range of visual inspection data can be improved and more accurate inspection of industrial assets can be achieved without requiring specialized equipment or personnel.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and serially-arranged by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be serially-arranged by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system comprising:
   an inspection tube extending from a proximal end to a distal end along a longitudinal axis, the inspection tube comprising:
      a variable stiffness section including a plurality of serially-arranged linkages extending along the longitudinal axis,
      the plurality of serially-arranged linkages include a distal linkage provided at a distal end of the variable stiffness section, and wherein each linkage of the plurality of serially-arranged linkages includes a lumen extending therethrough along the longitudinal axis,
      at least one stiff section extending along the longitudinal axis between the proximal end and the distal end of the inspection tube and coupled to a proximal end of the variable stiffness section or a distal end of the variable stiffness section,
      a plurality of articulation cables, and
      a tensioning element, separate from the plurality of articulation cables, and extending through the lumens of the plurality of serially-arranged linkages along the longitudinal axis, wherein a distal end of the tensioning element is coupled to the distal linkage; and
   an actuator coupled to a proximal end of the tensioning element and configured to adjust a longitudinal force exerted on the tensioning element such that a stiffness of the variable stiffness section can be tuned to a desired level, wherein the plurality of serially-arranged linkages are drawn into contact with one another when the stiffness of the variable stiffness section is increased and slack is introduced between the plurality of serially-arranged linkages when the stiffness of the variable stiffness section is reduced.

2. The system of claim 1 further comprising:
   a sensing section provided at the distal end of the inspection tube, wherein the sensing section comprises at least one sensor configured to acquire sensing data during an inspection; and
   an inspection control unit coupled to the proximal end of the inspection tube, the inspection control unit including
   a controller communicatively coupled to the actuator and configured to cause the actuator to adjust the longitudinal force exerted on the tensioning element.

3. The system of claim 2, wherein movement of the actuator in a first direction causes the tensioning element to reduce the longitudinal force exerted on the plurality of serially-arranged linkages to cause the stiffness of the variable stiffness section to be reduced and movement of the actuator in a second direction, opposite to the first direction, causes the tensioning element to increase the longitudinal force exerted on the plurality of serially-arranged linkages to cause the stiffness of the variable stiffness section to be increased.

4. The system of claim 3, wherein the actuator includes a motor attached to a spool, the tensioning element configured to unwind from the spool when the motor is actuated in the first direction and to wind around the spool when the motor is actuated in second direction opposite to the first direction.

5. The system of claim 3, wherein the actuator is a knob attached to a spool, the tensioning element configured to wind around the spool when the knob is actuated in one direction and configured to unwind from the spool when the knob is actuated in another direction.

6. The system according to claim 2, wherein the tensioning element is a nitinol wire; and the system further includes a power supply communicatively coupled to the controller and to the nitinol wire, wherein, the controller is configured to increase current provided by the power supply causing the nitinol wire to contract in length, or decrease current provided by the power supply causing the nitinol wire to extend in length.

7. The system according to claim 6, wherein the plurality of serially-arranged linkages are made from at least one of ceramic and plastic.

8. The system of claim 2, wherein the inspection control unit further comprises a computing device including a user interface configured to receive user inputs to operate the inspection tube, the user interface including one or more user interface objects operative to adjust the longitudinal force exerted on the longitudinal axis extending through the plurality of serially-arranged linkages.

9. The system of claim 8, wherein the inspection control unit further comprises a display screen to display at least one of a stiffness value, a stiffness setting, a stiffness controller, and a preprogrammed mode.

10. The system of claim 2, wherein the at least one sensor includes at least one of a camera, a light, a temperature sensor, a proximity sensor, and a flow sensor.

11. The system of claim 1, wherein the plurality of serially-arranged linkages are made from at least one of brass, aluminum, steel, ceramic, and plastic.

12. The system of claim 1, wherein the plurality of articulation cables extend through the inspection tube, and wherein the actuator is further configured to selectively control the plurality of articulation cables to articulate the inspection tube.

13. The system of claim 1, wherein each linkage of the plurality of serially-arranged linkages further includes a cylindrically-shaped body and a protrusion extending longitudinally from the cylindrically-shaped body.

14. The system of claim 13, wherein the protrusion of each linkage is configured to be received within the cylindrically-shaped body of a distally adjacent linkage when the plurality of serially-arranged linkages are drawn into contact with one another when the stiffness of the variable stiffness section is increased.

15. The system of claim 14, wherein each protrusion includes a tapered collar having a sloped surface.

16. The system of claim 14, wherein each protrusion is dome shaped.

17. A borescope system comprising:
a borescope;
an inspection tube coupled to the borescope and comprising a plurality of serially-arranged linkages extending along a longitudinal axis from the borescope to a distal end, wherein each linkage of the plurality of serially-arranged linkages includes a lumen extending therethrough along the longitudinal axis;
a plurality of articulation cables extending through the inspection tube;
a tensioning element, separate from the plurality of articulation cables, and extending through the lumens of the plurality of serially-arranged linkages along the longitudinal and coupled to at least a distal linkage of the plurality of serially-arranged linkages; and
an actuator coupled to the tensioning element and the plurality of articulation cables and configured to adjust a longitudinal force exerted on the tensioning element such that a stiffness of the variable stiffness section can be tuned to a desired level.

18. The borescope system of claim 17, wherein the actuator is further configured to selectively control the plurality of articulation cables to articulate the inspection tube.

19. The borescope system of claim 17, wherein the plurality of serially-arranged linkages are drawn into contact with one another when the stiffness of the variable stiffness section is increased and slack is introduced between the plurality of serially-arranged linkages when the stiffness of the variable stiffness section is reduced.

20. The borescope system of claim 17, further comprising a sensing section provided at the distal end of the inspection tube, wherein the sensing section comprises at least one sensor configured to acquire sensing data during an inspection.

* * * * *